United States Patent [19]

Casasent

[11] Patent Number: 5,061,063

[45] Date of Patent: Oct. 29, 1991

[54] METHODS AND APPARATUS FOR OPTICAL PRODUCT INSPECTION

[75] Inventor: David P. Casasent, Pittsburgh, Pa.

[73] Assignee: Philip Morris Incorporated, New York, N.Y.

[21] Appl. No.: 428,926

[22] Filed: Oct. 30, 1989

[51] Int. Cl.⁵ ........................... G06K 9/74; G06K 9/64
[52] U.S. Cl. ...................................... 356/71; 250/556; 382/42
[58] Field of Search .................. 356/71, 444; 250/556; 209/523, 524, 528, 535, 536, 540, 546, 552, 556; 382/42, 43; 364/819, 821, 822

[56] References Cited

U.S. PATENT DOCUMENTS

| | | | |
|---|---|---|---|
| 3,398,269 | 8/1968 | Williams | 382/42 |
| 4,622,875 | 11/1986 | Emery et al. | 209/535 |
| 4,736,099 | 4/1988 | Zelenka | 356/444 |
| 4,833,637 | 5/1989 | Casasent et al. | 364/822 |
| 4,906,099 | 4/1990 | Casasent | 356/394 |

OTHER PUBLICATIONS

A. Mahalanobis et al., "Minimum Average Correlation Energy Filters," *Applied Optics*, Sep. 1, 1987, vol. 26, No. 17, pp. 3633–40.

R. A. Sprageu, "A Review of Acousto-Optic Signal Correlators," *Optical Engineering*, Sep./Oct. 1977, vol. 16, No. 5, pp. 467–74.

D. Casasent et al., "General I and Q Data Processing on a Multichannel AO System," *Applied Optics*, Sep. 15, 1986, vol. 25, No. 18, pp. 3217–24.

*Primary Examiner*—Vincent P. McGraw
*Assistant Examiner*—LaCharles P. Keesee
*Attorney, Agent, or Firm*—Robert R. Jackson

[57] ABSTRACT

Lines of text (e.g., printing on a product) are verified by forming a one-dimensional image of each line substantially parallel to its length. This one-dimensional image information is compared to corresponding information for the intended lines of text. This comparison is preferably done using acousto-optic correlator systems. Space and frequency multiplexing may be used to allow parallel processing of several lines of text and/or to allow comparisons with multiple references to be made simultaneously. The invention may be used to determine the acceptability of products based on the correctness of the text image, and to reject products on which the correct text does not appear.

54 Claims, 5 Drawing Sheets

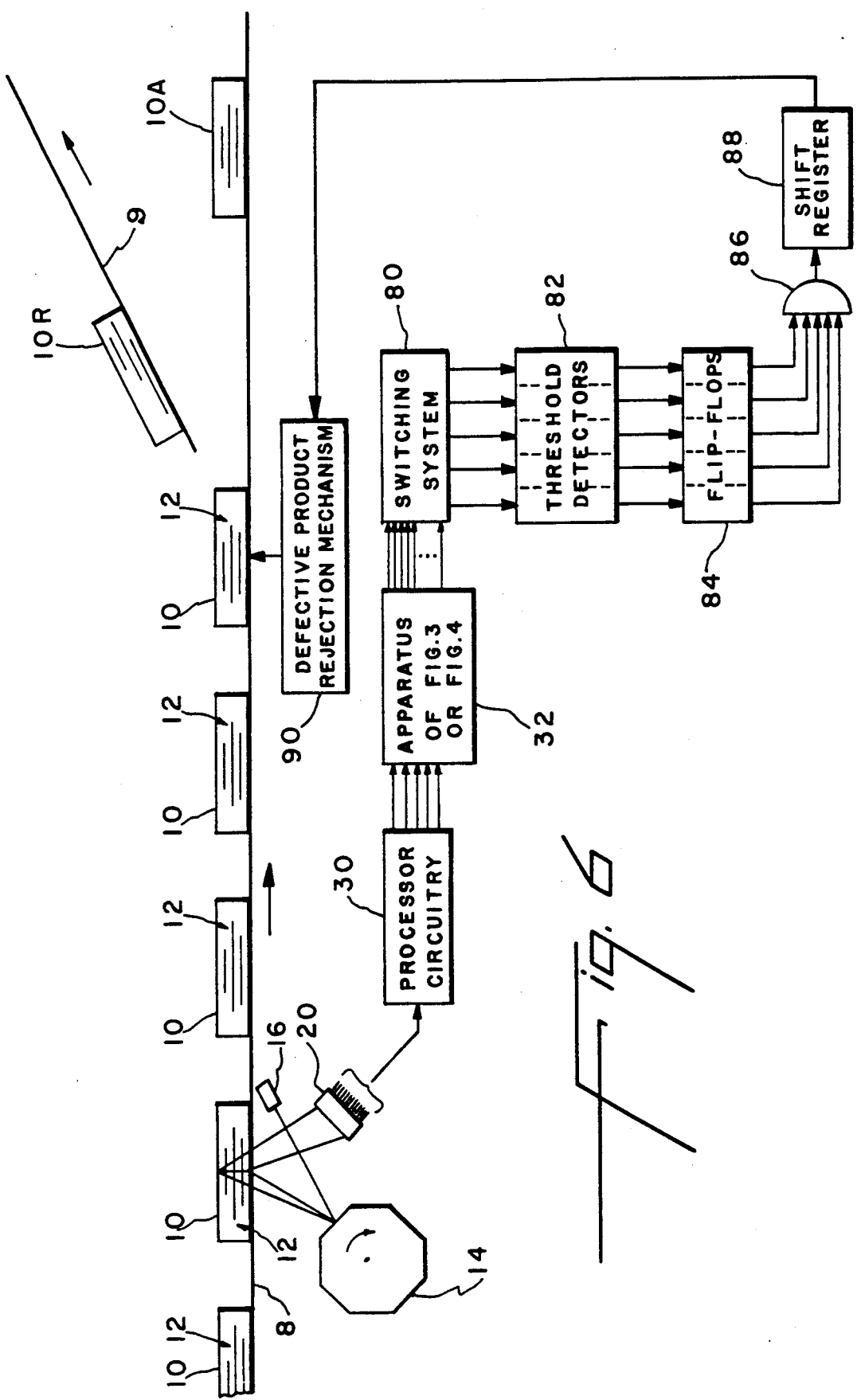

METHODS AND APPARATUS FOR OPTICAL PRODUCT INSPECTION

BACKGROUND OF THE INVENTION

This invention relates to optical product inspection, and more particularly to inspecting products optically in order to ensure that they include required image information such as certain text.

Automated inspection of visual appearance is desirable or required for many products, especially those made in large quantities and/or at high speeds. For example, in the United States, cigarette packages are required to bear a label known as the Surgeon General's warning which must be changed every three months and which may vary in configuration from cigarette brand to cigarette brand. It would be advantageous to be able to inspect each package to ensure that it contains the proper message and message configuration, that the message is properly located, that the message is legible (e.g., not smeared), etc. However, cigarette packages are typically made at such high speeds (e.g., currently about 720 packages per minute) that such inspection is only practical if automated. Optical character recognition is a technology which might be considered as a solution to this problem. However, because it is not necessary to actually read and recognize each individual character, optical character recognition involves gathering and processing more information than is really needed. Accordingly, optical character recognition tends to be too expensive and/or too slow for this application.

In view of the foregoing, it is an object of this invention to provide improved methods and apparatus for optically inspecting products for the presence, correctness, and acceptability of visual information, and especially textual information.

It is a more particular object of this invention to provide methods and apparatus, characterized by very high speed and relatively low cost, for optically inspecting products to ensure that predetermined visual information, and especially textual information, is present, properly located, and acceptable.

SUMMARY OF THE INVENTION

These and other objects of the invention are accomplished in accordance with the principles of the invention by scanning or otherwise sensing one or more two-dimensional regions of the product to be inspected in order to produce a one-dimensional image of each such two-dimensional region. The one-dimensional image information for each two-dimensional region is correlated or otherwise compared to the corresponding one-dimensional image information for an acceptable product. If the one-dimensional image information for each region compares favorably with the expected information for that region, the product is accepted. Otherwise, the product is rejected. Although the above-mentioned correlations or comparisons can be done using analog or digital signal processing, in the currently preferred embodiments these functions are performed optically in order to achieve very fast and highly reliable processing at relatively low cost. In the particularly preferred embodiments, the optical correlation is enhanced by space and frequency multiplexing in order to make it possible to compare the one-dimensional image information to all of the possibly acceptable information so that the hardware of the apparatus does not have to be changed in any respect when the product being inspected changes. In this way, the apparatus can be used to accept any of several different products, and to reject any product which does not sufficiently correspond to one of the acceptable products. Alternatively, a purely software change can be made to cause the apparatus to accept only products of a kind different from those previously being inspected. Or the apparatus can be used to identify and/or sort various different products.

Further features of the invention, its nature and various advantages will be more apparent from the accompanying drawings and the following detailed description of the invention.

BRIEF DESCRIPTION OF THE DRAWINGS

FIG. 6 is a simplified schematic block diagram of an illustrative product processing system constructed in accordance with the invention.

DETAILED DESCRIPTION OF THE PREFERRED EMBODIMENTS

Although the invention will be described in the context of its application to inspecting cigarette packages for the labels known as the Surgeon General's warning, it will be understood that the invention is equally applicable to many other product inspection situations, and it will be readily understood from this specification how the invention can be adapted to such other situations.

There are four different Surgeon General's warning messages which must be changed on a rotating basis every three months. Each message may appear in several different configurations, e.g., depending on package size or shape. For illustrative purposes, it is assumed herein that there are up to five possible configurations for each message, and that each configuration consists of two to five lines of text. The label is printed on the side of the package where it must be centered to within one millimeter. Each line of text is 2.5 mm high and contains from one to seven words.

Because the words that should be present are known and their locations are also known (within one millimeter), it is not necessary to read each letter or word in order to verify the text. Instead, it is sufficient to read an entire line and process the resulting information as a whole rather than letter-by-letter. Moreover, it is not necessary to determine what message is present, but only to note whether or not it is the correct message. The other possible, currently unwanted messages are also known, so that, if desired, the system can be "trained" against them, thereby enhancing system performance.

A typical approach to identification of two-dimensional patterns is to compare the input pattern to several reference patterns in order to determine which reference matches the input. The known techniques first produce a two-dimensional image by some form of sensing or scanning of the product. In accordance with the present invention, one-dimensional rather than two-dimensional information is used in order to simplify the data acquisition system and to allow the use of a faster, simpler, and less expensive processor. In particular, each horizontal line of text is collapsed to a single one-dimensional image signal (i.e., each line of text is integrated vertically). These one-dimensional image signals are then processed in a manner which can be much simpler, faster, and more economical than the processing that would be required for two-dimensional image processing.

Figure 1:
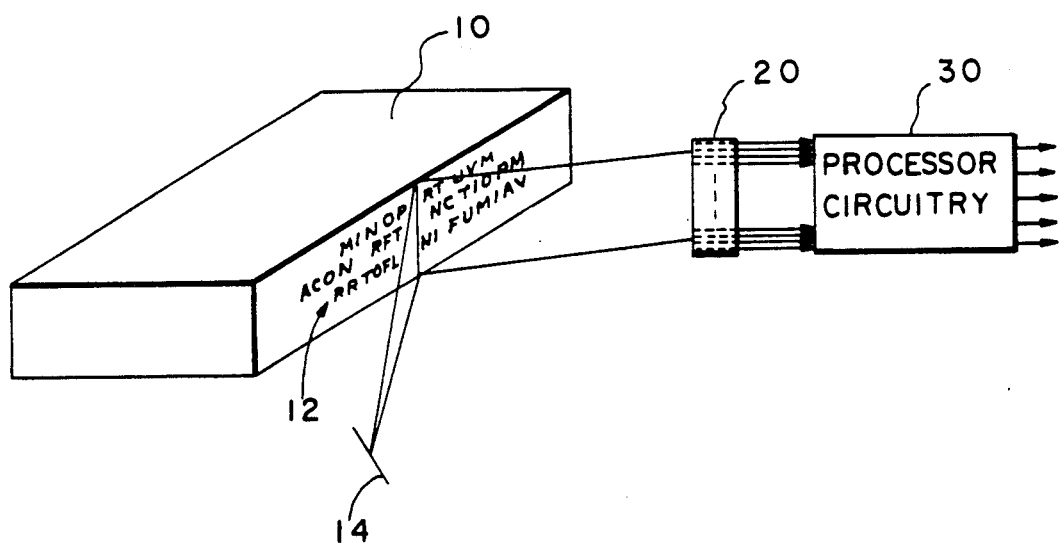
FIG. 1 is a simplified, partly perspective, partly schematic view of illustrative apparatus constructed in accordance with this invention.

There are various ways in which the above-mentioned one-dimensional image signals can be produced. In the preferred embodiment shown in FIG. 1, cigarette package 10 has illustrative three-line warning label 12 on one side panel. Label 12 is scanned (e.g., from left to right as viewed in FIG. 1) by light from a conventional laser (not shown in FIG. 1 but shown as element 16 in the more complete system diagram of FIG. 6). A pivoting or rotating reflective surface 14 is used to cause the laser light to scan label 12, and the light reflected from the label is directed to a plurality of detectors 20 arranged in a vertical array. Although the number of detectors may vary with the application, in the illustrative embodiment 64 detectors are employed. Each detector 20 produces an output signal or signals proportional to the amount of light it receives. The detector outputs can be in parallel or each detector output can be read out sequentially. The time-sequential outputs from the detectors are thus the two-dimensional image of the label.

Figure 2:
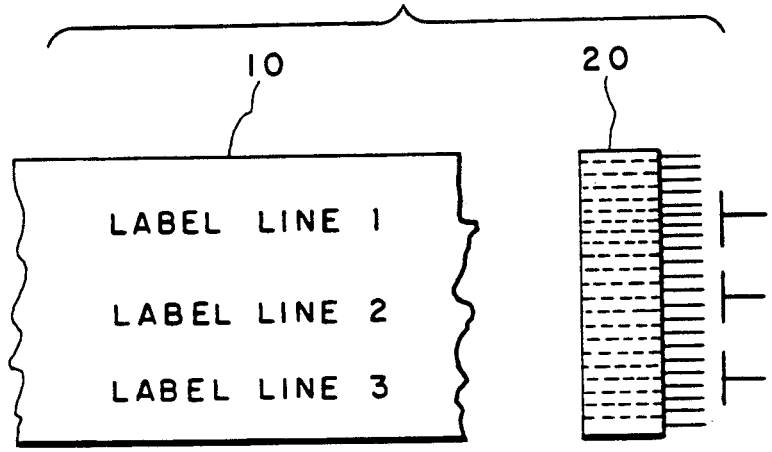
FIG. 2 is a more detailed schematic representation of a portion of FIG. 1.

As an alternative to such a large number of detectors 20, the vertical size of the detectors could be chosen to be the height of a line of imaged text. Alternatively, the imaging optics (not shown) from the package could adjust the image size onto the detectors so that one detector corresponds to one line of text. In either of these cases the detector outputs are the integrated one-dimensional lines of text. A more general and flexible technique is illustrated by FIG. 2 and involves employing a large number of detectors 20 (e.g., 64 as mentioned above) and selectively combining or summing several adjacent detector outputs to produce the one-dimensional image signal for each line of text. When the proper elements are summed, this produces the vertical sum of each line of text. In the case of cigarette label verification, for example, 64 detectors are used and eight adjacent horizontal scan lines (i.e., the outputs of eight adjacent detectors) are summed for each line of text. The expected location of each line of text is known and thus the eight detectors to be summed for each line are known. Each sum can be readily provided by processor circuitry 30 (FIG. 1), and the selection of which detectors are to be summed can be adjusted by external control. For the inspection of the above-described cigarette labels, from two to five such sums are needed, depending on the label to be verified at any given time. (It will be understood that the numbers 64 and eight are used in the foregoing discussion merely as an illustration, and that any numbers of detectors can be used as desired.)

Each of the one-dimensional image signals produced by processor circuitry 30 must be compared to the corresponding one-dimensional signal from the label expected to be present. There are many possible known one-dimensional correlators (e.g., digital, analog, electronic, and optical correlators). In the preferred embodiments one-dimensional optical correlators are used. Such correlators are preferred because they are extremely fast and because they facilitate space and frequency multiplexing as described below.

Figure 3:
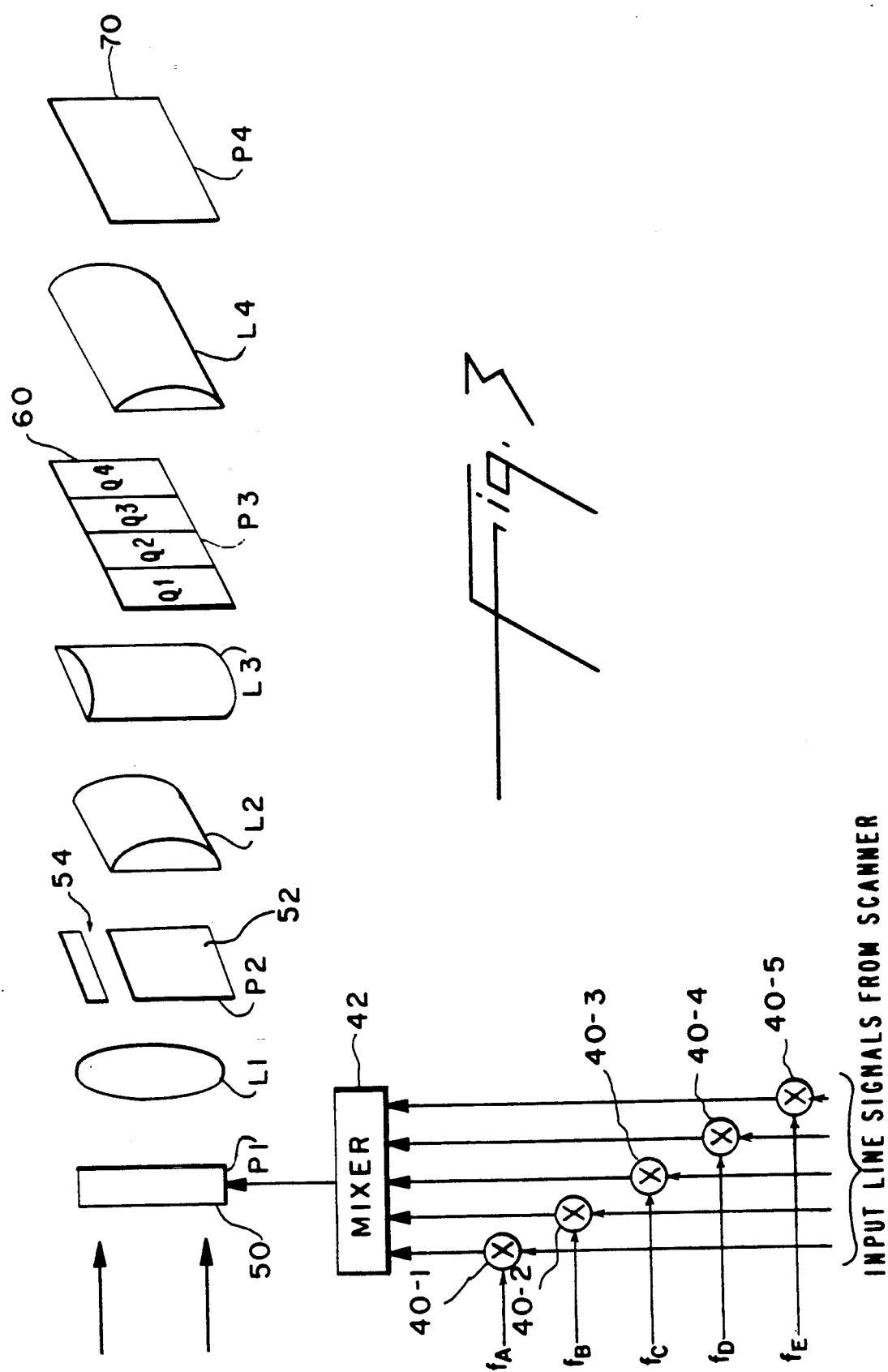
FIG. 3 is a simplified schematic view of further illustrative apparatus constructed in accordance with this invention.

The basic optical correlator of the preferred embodiments is an acousto-optic ("AO") space-integrating ("SI") architecture (see R.A. Sprague, "A Review of Acousto-Optic Signal Correlators", *Optical Engineering*, Vol. 16, No. 5, September/October 1977, pp. 467–474). The particular version of this architecture employed in the preferred embodiments, and modified in accordance with the present invention, is shown in FIG. 3. The architecture of FIG. 3 builds on known space and frequency multiplexing concepts (see D. Casasent and J. Lambert, "General I and Q Data Processing on a Multichannel AO System", *Applied Optics*, Vol. 25, No. 18, pp. 3217-3224, 15 Sept. 1986). This architecture has the advantages that it (1) allows storage of the reference pattern or patterns on film, (2) facilitates space and frequency multiplexing, and (3) reduces the number of required detectors.

Turning now to a detailed consideration of FIG. 3, the input one-dimensional data (from processor circuitry 30 in FIG. 1) is fed to AO cell 50 at plane P1. AO cell 50 modulates input light incident from the left as viewed in FIG. 3. This light is approximately monochromatic (i.e., one wavelength) but need not be coherent. It can originate from a light emitting diode, laser diode, etc. The light modulated by AO cell 50 is imaged onto plane P3 by lenses L1, L2, and L3. Plane P3 contains information regarding several one-dimensional references $h_n$ recorded on film in the form of a bank of so-called MACE filters 60 (see A. Mahalanobis, B.V.K.V. Kumar, and D. Casasent, "Minimum Average Correlation Energy [MACE] Filters," *Applied Optics*, Vol. 26, No. 17, 1 Sept. 1987, pp. 3633–40). The references for each quarter of the year are respectively recorded in vertical sections Q1-Q4 of filter bank 60 as is discussed in more detail below. The light leaving P3 is thus the product $g(x)h_n(x)$ of the one-dimensional data g in P1 (i.e., the data for one line of text) and the N references in P3 (e.g., the five different configurations of that line in each of the four quarters of the year). (The variable x is explained below.) Lens L4 integrates this one-dimensional product, and on N detectors 70 positioned horizontally in P4 we find:

$$c_n = \int g(x)h_n(x)dx \qquad (1)$$

When the one-dimensional input signal is fed to AO cell 50, a piezoelectric transducer converts that signal to an acoustic signal. This acoustic signal propagates along the aperture of P1. Thus, the transmittance of P1 varies with time t and space or distance x along P1 as $g(x-tv)$, where v is the velocity of sound in AO cell 50. Thus Equation (1) becomes:

$$c_n(t) = \int g(x-tv)h_n(x)dx \qquad (2)$$

and the $c_n$ outputs on N detectors 70 are the N one-dimensional correlations of the input g and the N references $h_n$.

In practice, the input to AO cell 50 is placed on a carrier frequency by a modulator 40 in FIG. 3, and element 52 at plane P2 is a spatial filter which selects one sideband of the P1 signal. Thus P2 contains an aperture or slit 54 which performs single sideband ("SSB") filtering. (The details of SSB filtering are conventional in AO processing (see the above-mentioned paper by Casasent and Lambert).) Lenses L1, L2, and L3 are chosen (in a straightforward manner) to image P1 vertically at P3 and to expand P1 horizontally across several reference functions in P3. Thus, P1 is simultaneously imaged onto multiple vertical masks 60 at different horizontal locations in P3.

The preceding description is for a space-multiplexed system (with N reference patterns spatially separated or multiplexed horizontally at P3). In particular, in the cigarette package label embodiment being discussed, one possibility is to place a set of five horizontally spaced vertical masks in each quarter Q1-Q4 at P3, i.e., one for each of the five possible configurations of the message for that quarter. Each of these sets would have from two to five masks (one for each line of text).

If desired, frequency multiplexing can be used to perform some of the work performed by space multiplexing in the foregoing discussion. In addition, frequency multiplexing can be used to allow simultaneous processing of multiple lines of text. The principles of frequency multiplexing will now be discussed.

If at each of N horizontal locations in P3 we place F reference functions which are frequency multiplexed, then P3 contains NF references space and frequency multiplexed, and the input at P1 can be correlated with the NF reference functions. For example, in a simple example involving the processing of only one line of text, N might be 4 (the number of quarters in a year) and F might be 5 (the number of possible configurations of that line in each quarter). To explain frequency multiplexing most easily, note that the P1 input is present on a carrier at, for example, frequency $\omega_0$, i.e., $g(x) \cos \omega_0 x$ (time dependence being ignored for simplicity). The F references at one horizontal location in P3 are of the form:

$$h_1(x) \cos \omega_1 x + h_2(x) \cos \omega_2 x + ... \quad (3)$$

i.e., each $h_n$ is present on a different frequency $\omega_n$. The product of the P1 and P3 data thus has F terms of the form (for the first term):

$$g(x) h_1(x) \cos \omega_0 x \cos \omega_1 x \quad (4)$$

Using trigonometric identities, the term of interest in Expression (4) is:

$$g(x) h_1(x) \cos (\omega_0 - \omega_1) x \quad (5)$$

The light represented by this term leaves plane P3 at an angle proportional to $\omega_0 - \omega_1$ and it focuses at some position $y_{01}$ proportional to $\omega_0 - \omega_1$ vertically in plane P4. The other terms leaving P3 are similar to (5) with $h_2$, $h_3$, etc., replacing $h_1$ and with $\omega_2$, $\omega_3$, etc., replacing $\omega_1$. Thus, these other terms leave P3 at different angles proportional to $\omega_0 - \omega_2$, $\omega_0 - \omega_3$, etc. They thus focus at different locations $y_{02}$, $y_{03}$, etc., vertically in one column at plane P4. With each of the N filters at P3 having F frequency multiplexed patterns, plane P4 contains N detectors horizontally and F detectors vertically and the output signals from these NF detectors over time are the correlations of the P1 input with the NF reference functions synchronized with the scanning of the label.

To briefly recapitulate the foregoing, at each of the N horizontal locations in P3 we place F reference functions which are superimposed on one another by frequency multiplexing (i.e., with each reference function on a different spatial frequency carrier $\omega_f$). The P1 input on a carrier $\omega_0$ multiplies these F different signals, and thus F beams leave each horizontal location in P3 at vertical angles proportional to $\omega_0 - \omega_f$. These beams focus at F different vertical locations in P4. Thus, at P4 there are N outputs horizontally and F outputs vertically. The time history of the output signals from these NF detectors are the correlations of the P1 data with the NF reference functions. Thus, frequency multiplexing increases the number of reference functions with which correlations can be simultaneously made.

As a final consideration, the inputs to P1 are also frequency multiplexed. Each of the G signals from processor 30 is superimposed on a respective one of G different carrier frequencies $\omega_A$, ..., $\omega_G$ by modulators 40. (In FIG. 3 these carrier frequencies are designated $f_A$ through $f_E$, where $\omega = 2\pi f$.) The P1 input now contains five signals $g_1(x) \cos \omega_A x$ through $g_5(x) \cos \omega_E x$, i.e., five signals $g_1$ to $g_5$ frequency multiplexed on five carriers $\omega_A$ to $\omega_E$ (rather than having only one carrier $\omega_0$ as before). These signals are then combined by mixer 42 and applied to AO cell 50. Each of these signals is correlated with the NF references at P3. Because each signal at P1 has a different carrier frequency, its correlations occur in different vertical regions at P4. Thus, P4 now contains G sets of F by N detectors, with N detectors horizontally and FG detectors vertically. The system can therefore correlate each of the G inputs to P1 with all FN references at P3.

In the cigarette package label verification context mentioned above, there are N=4 messages (one for each calendar quarter) in five configurations with an average of four lines of text in each, or a total of NF=4×5×4=80 references (possible lines of text). There are N=4 filter groups at P3, with each group corresponding to the labels for one quarter of the year. There are F filters in each group at each of the N P3 locations. For one quarter this requires F=5×4=20 lines of text (five configurations and an average of four lines of text in each). The G=5 inputs to P1 are the five (maximum) lines of text from the product. Thus, at P4 there are 4 columns of GF=5×20=100 detectors each. The system can process the data for a package in about one microsecond, which is many times faster than is required to keep pace with the production of the packages.

As an alternative to the foregoing, the F filters could be spatially (rather than frequency) multiplexed at P3. This may be preferable because it reduces the range of the G=5 frequencies $\omega_A$ to $\omega_E$ required at P1. (Because each P1 input frequency (e.g., $\omega_A$) multiplies F frequencies $\omega_f$ at P3, and because all F difference frequencies $\omega_A - \omega_f$ must be separated at P4, the adjacent P1 input frequency $\omega_B$ must be separated sufficiently from $\omega_A$ so that its F outputs at $\omega_B - \omega_f$ occur in different vertical regions of P4, etc.) In this case, P3 contains FN=80 one-dimensional references spatially multiplexed (i.e., horizontally spaced), and P4 contains 80 detectors horizontally and five vertically.

It will be understood that other combinations of space and frequency multiplexing of the FN=80 one-dimensional references at P3 are possible, included, and require no further explanation. It will also be understood that all five (maximum) lines of text in each configuration will not be aligned (vertically) with one line of text in the input under test. Thus, the use of 80 one-dimensional references for each input line of text is a very worst-case scenario.

Those skilled in the art will appreciate that in all of the foregoing embodiments in which P1 is frequency multiplexed, the desired P4 outputs (considering only the references for the quarter under consideration) occur on several vertical lines in P4. Thus, detector 70 could be a set of linear detector arrays or a two-dimensional camera oriented to scan vertically. Each vertical scan produces an output signal which includes samples of several frequency-multiplexed correlations. Accordingly, any desired correlation (the time output from any P4 detector) can be selected for further processing as discussed below in connection with FIGS. 5 and 6 by appropriate switching of this scan signal. For example, within one quarter there are (average) 20 lines of text possible (references) and five input lines of text. These 100 correlation signals can be processed serially or in parallel as desired, again with appropriate switching of the resulting signal or signals to allow selection of correlations captured anywhere on plane P4.

Consideration will now be given to the synthesis of the filters at plane P3 in FIG. 3. The objective is for these integrated one-dimensional signal descriptions of one line of text to provide large and sharp correlation peaks with the proper input line of text while producing low values for other input lines of text. If the references used were simply the integrated one-dimensional versions of the various lines of text, then various false correlation peaks might result. This may occur because when a line of text is integrated, different lines of text look more similar. New filters are therefore desirable in order to make the system of FIG. 3 more robust and reliable.

In the particularly preferred embodiments the filters employed are modified "minimum average correlation energy" ("MACE") filters. MACE filters are described in detail in the above-mentioned paper by Mahalanobis et al. The prior use and synthesis of these filters will now be reviewed, followed by a discussion of the modifications made in accordance with this invention.

The original MACE filter is intended to recognize distorted versions of one object and to give the same correlation for each. This differs significantly from the present application in which (1) the objects are one-dimensional rather than two-dimensional, and (2) there is only one true class object (line of text) and the objective is to reject similar lines of other text. In the prior applications the MACE filter is used in a frequency plane correlator, not in an image plane correlator as used here. In the prior applications the conjugate Fourier transform H* of the filter h and the Fourier transform G of the input g are used. The Fourier transforms are multiplied and the product GH* is inverse-transformed to produce the two-dimensional correlation g*h of g and h. Thus, the original MACE filter is synthesized and used as its Fourier transform H. Denoting the two-dimensional Fourier transform of each of the N training set images used to form the filter by $X_i$ (where i=1, ..., N), we then form the matrix:

$$X = [X_1 X_2 \ldots X_N] \quad (6)$$

which has the $X_i$ as its columns. We form a diagonal matrix $D_i$ from each $X_i$, where the diagonal elements are the elements of $X_i$. We then add all N matrices $D_i$ to form $$D = \sum_{i=1}^{N} D_i \quad (7)$$

We require that the filter function give a correlation peak value $u_n$ for training set image n (e.g., $u_n = 1$ for true class objects and $u_n = 0$ for other objects). The solution H for the Fourier transform of the filter function is then $$H = D^{-1} X (X^H D^{-1} X)^{-1} u \quad (8)$$

where the superscript $-1$ denotes a matrix inverse, the superscript H denotes Hermetian, and the vector element has elements $u_n$. This filter thus gives a peak output of 1 for training images in one class (where $u_n = 1$) and gives a small peak output ($u_n = 0$) for other images.

In the present application, there is only one true class input (the line of text to be recognized), and its peak value is specified as $u_n = 1$. The corresponding lines of text on the other labels in a given quarter are used as false class training images with specified peak values of $u_n = 0$. All training images in this case are one-dimensional. The Fourier transforms of these images are entered as $X_i$. H is then formed and inverse-Fourier-transformed in order to obtain the filter h to be used. One such filter is produced for each line of text in each configuration on each label and placed at the appropriate location in plane P3 of FIG. 3 as described above.

Figure 4:
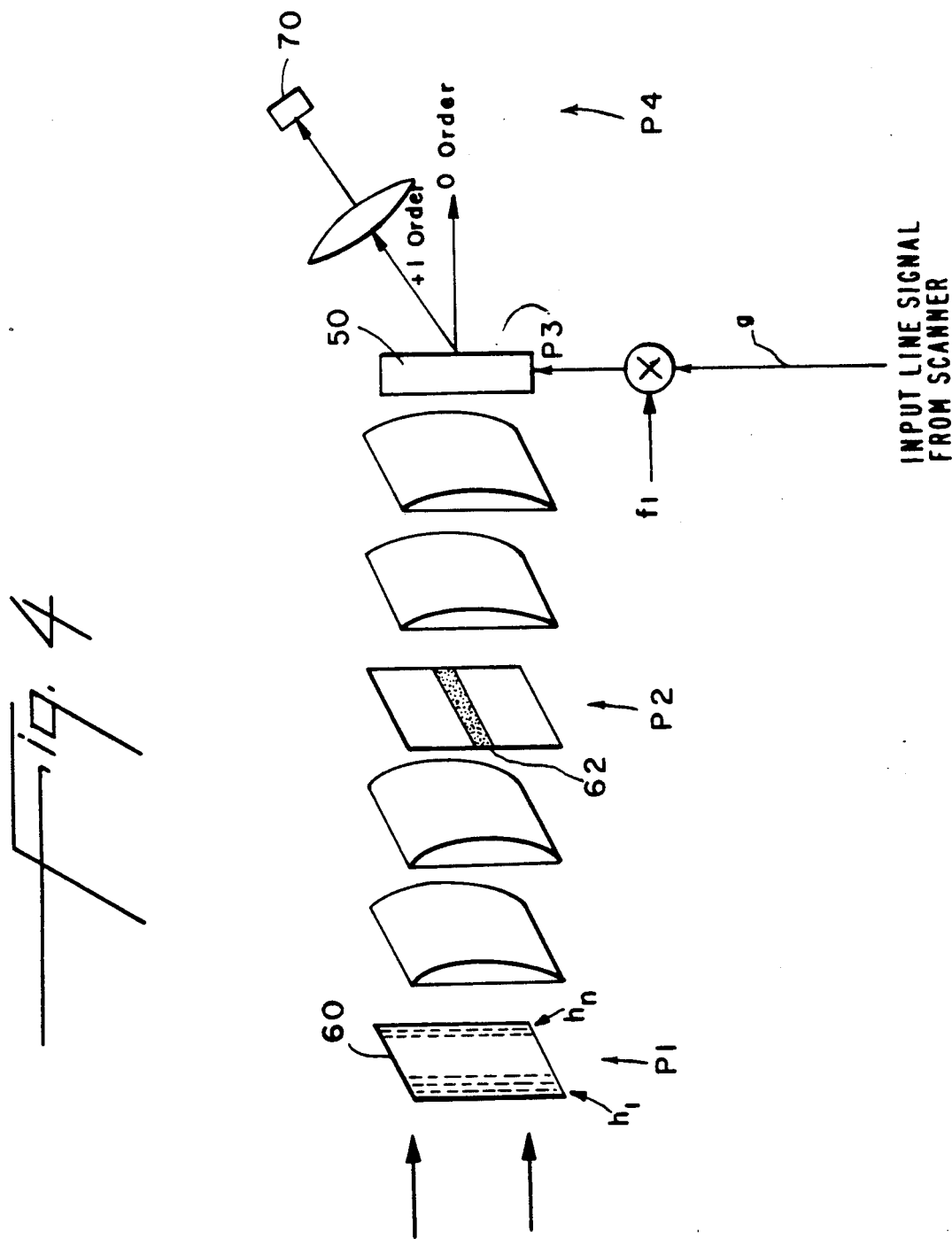
FIG. 4 is a view similar to FIG. 3 showing alternative illustrative apparatus constructed in accordance with this invention.

Although the modified MACE filters described above can be used at plane P3 in FIG. 3, another even more preferred architecture in which they can be employed is shown in FIG. 4 (for the case of one input g to the AO cell at P3). In this architecture the reference filters 60 are placed at plane P1 and illuminated by approximately monochromatic light. AO cell 50 is placed at plane P3 and the input data g is applied to the AO cell as described above in connection with FIG. 3. This is necessary because the filters $h_n$ at P1 are bipolar. Thus, to record these filters on film for use at plane P1 in FIG. 4 it is necessary to place them on a bias. A DC stop 62 is therefore placed at the Fourier transform plane P2. This removes the P1 bias and produces bipolar references incident on P3. (Alternatively, one could record two masks for each reference (one containing positive filter data and the other containing negative filter data). With the number of output detectors doubled, one could form the difference of pairs of detectors and thereby handle bipolar filters.) The products $gh_n$ leave the AO cell at an angle (proportional to the difference between the carrier frequencies used for g and $h_n$). This is the +1 order light shown, and therefore the plane P4 detectors 70 are placed off-axis as shown in FIG. 4.

Figure 5A:
FIGS. 5a and 5b are signal diagrams useful in explaining the invention.
Figure 5B:
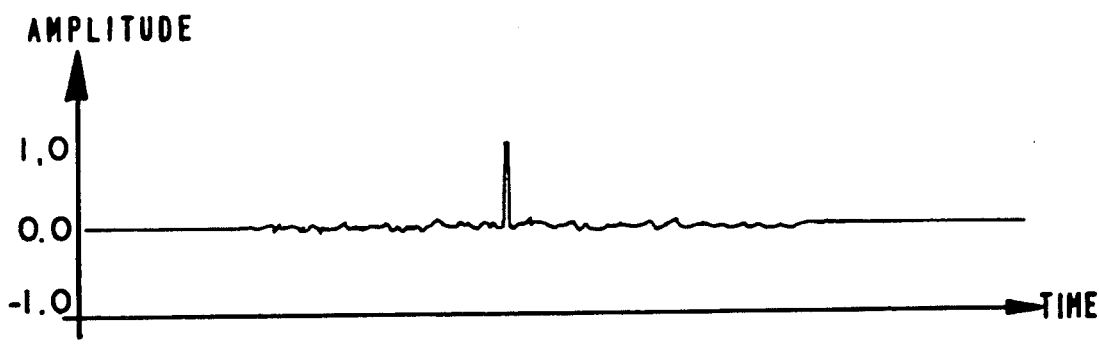

FIG. 5a shows a typical time output of detector 70 in FIG. 4 when the input data is not the correct line of text. FIG. 5b, on the other hand, shows a typical detector 70 output signal when the correct line of text is present. The presence of the strong peak (shown in FIG. 5b) therefore indicates that the correct text is present. The absence of this peak indicates that the correct text is not present or that it is unacceptably skewed, blurred, etc.

For the cigarette package application, the text should still be recognized even though it is shifted vertically by one millimeter. Assuming that the height of the line is about 2.5 mm, this causes about a 40% loss of information, with a consequent 40% drop in the peak shown in FIG. 5b. This can be accommodated by setting the threshold for detecting the FIG. 5b peak at or slightly below 60% of the maximum value.

Because the horizontal location of the package being inspected is known, it is only necessary to look at the central region of the correlation plane (e.g., only the central ±10% of that plane). This principle can be used to reduce the amount of detector output data that must be analyzed if desired. For example, only the portion of the detector output signal occurring at about the time the correlation peak should occur must be captured and analyzed.

If the input text rotates (e.g., due to skew of the label), the correlation peak decreases. For a specified amount of allowable rotation, any desired correlation peak value can be achieved by including rotated lines of text as true class data ($u_n=1$) in the filter synthesis algorithm. When the amount of expected rotation is small (several degrees) as is the case for cigarette package labels, the decrease expected in the correlation peak can be calculated (by correlating rotated inputs vs. the reference computed from non-rotated training images) and the threshold for detection can be reduced (i.e., additional false class rotated training images are not needed). Alternatively, a combination of additional rotated training images and a reduced detection threshold can be used.

To detect if the input text is blurred, and to control the amount of blur that is allowed, the following technique can be used. Ordinarily the filters of this invention give greatly reduced correlation peak values when the input text is blurred. If some amount of blur is acceptable, then the training set data can be convolved with Rect functions (i.e., rectangular pulses) of appropriate widths. The width of the Rect function determines the amount of blur desired. The blurred images are used to synthesize the filter. In this way the system is set up to control the amount of blur that will be found acceptable. Alternatively, the drop in the correlation peak value (for a given amount of input blur) can be measured and the threshold for detection reduced. As still another alternative, a combination of additional blurred training images and threshold reduction can be used.

In all correlation peak detection cases, the variance and mean of the output correlation being analyzed can be used to set the threshold used.

FIG. 6 shows a preferred embodiment of a label verification system constructed in accordance with this invention and employing the principles discussed above. Products 10 (e.g., cigarette packages bearing labels 12 to be verified) are conveyed from left to right on conveyor 8. The motion of conveyor 8 and the locations of products 10 on the conveyor are synchronized with the remainder of the apparatus so that as each product passes continuously rotating polygonal mirror 14, light from laser 16 is reflected by one facet of mirror 14 and made to scan (from left to right) across the label 12 on that product as described above in connection with FIG. 1. The light reflected by the label area of the product being scanned is detected by detectors 20 and the output signals of detectors 20 are processed by processor circuitry 30, all as discussed above in connection with FIGS. 1 and 2. The output signals of processor circuitry 30 (i.e., one signal for each of the five possible lines of text in label 12) are applied to apparatus 32 of the type shown in FIG. 3 or FIG. 4 in order to produce output signals indicative of the correlation of each of the input signals with the appropriate reference or references as discussed above in connection with FIGS. 3 and 4. FIGS. 5a and 5b show typical output signals of apparatus 32.

The output signals of apparatus 32 are applied to switching system 80 (e.g., a cross-point type switch which is capable of connecting any one input to any output) which allows selection of the (up to five) correlation output signals for text lines which should be present. (If the expected input label contains fewer than five lines, any output or outputs of switching system 80 which are not needed can be tied to a source of potential above the threshold established by the associated threshold detector 82 as discussed below.) Each of the correlation output signals thus selected is applied to a respective one of threshold detectors 82 which produces an output signal pulse if and only if the applied correlation contains a peak (as in FIG. 5b) which is above a predetermined threshold established by the threshold detector. The output signal of each of threshold detectors 82 is applied to a respective one of flip-flops 84 which register the output pulses of the threshold detectors. (Flip-flops 84 are, of course, reset each time the next product is about to be scanned.) AND gate 86 produces an output signal if and only if all of flip-flops 84 are registering a proper threshold detector output signal. Accordingly, AND gate 86 produces an output signal only when all of the lines of text on the label being scanned have been determined to be acceptable.

The output signal of AND gate 86 is applied to the data input terminal of shift register 88. Shift register 88 shifts at the same rate that products 10 are conveyed by conveyor 8 and has the same number of stages as there are products in transit from the scanning location adjacent elements 14 and 20 to defective product rejection mechanism 90. Accordingly, if a product has been determined to be acceptable, the associated AND gate 86 output signal will reach the output of shift register 88 concurrently with the arrival of that product at defective product rejection mechanism 90. If mechanism 90 receives the proper signal from shift register 88, it allows the product to continue along conveyor 8 as an accepted product 10A. However, if mechanism 90 does not receive such a signal from shift register 88, it deflects the product onto a branch conveyor 9 which conveys rejected products 10R away from the accepted products. Mechanism 90 may be any suitable device (e.g., a device for momentarily emitting a product-deflecting blast of air or for momentarily extending a product-deflecting finger when a product is to be diverted onto branch conveyor 9).

It will be understood that the foregoing is merely illustrative of the principles of this invention and that various modifications can be made by those skilled in the art without departing from the scope and spirit of the invention. For example, although the invention is preferably used to verify lines of text as described above, other kinds of input image patterns (e.g., pictorial or graphic images of any kind) can be substituted for lines of text and verified in the manner described above. As another example of modifications within the scope of this invention, many other techniques can be used for conveying and/or positioning products for inspection, depicted conveyor system 8 being only one such possibility.

The invention claimed is:

1. Apparatus for verifying that an input image pattern corresponds to a predetermined image pattern, each of said patterns including a plurality of two-dimensional image areas arranged in a predetermined array, each of said image areas including image information which varies in both of said two dimensions, said apparatus comprising:

means for producing a first output indication representative of a one-dimensional image of each of the two-dimensional image areas of said input image pattern, each of said one-dimensional images being taken substantially parallel to an axis of the associated two-dimensional image area;

means for comparing the first output indication associated with each two-dimensional image area to the first output indication that would result if said two-dimensional image area were the corresponding two-dimensional image area in said predetermined image pattern; and means for producing a second output indication indicating that said input image pattern is said predetermined image pattern if said means for comparing indicates that said first output indication associated with each two-dimensional image area is substantially the same as the first output indication that would result if each two-dimensional image area were the corresponding two-dimensional image area in said predetermined image pattern.

2. The apparatus defined in claim 1 wherein said means for producing a first output indication comprises:

a plurality of detectors;

means for directing each of a plurality of portions of one of said two-dimensional image areas of said input image pattern to a respective one of said detectors, each of said portions being substantially parallel to said axis of said one of said two-dimensional image areas, and said portions being substantially mutually exclusive and collectively exhaustive of the dimension of said one of said two-dimensional image areas perpendicular to said axis, each of said detectors producing an output signal indicative of the image information received by it; and means for summing the output signals of said detectors to produce said first output indication for said one of said two-dimensional image areas.

3. The apparatus defined in claim 2 wherein the location of said one of said two-dimensional image areas substantially perpendicular to said axis of said one of said two-dimensional image areas is subject to change throughout a range which is greater than the dimension of said one of said two-dimensional image areas perpendicular to said axis, wherein said portions are substantially mutually exclusive and collectively exhaustive of said range, and wherein said means for summing comprises means for selecting which detector outputs are summed to produce said first output indication.

4. The apparatus defined in claim 1 wherein said means for producing a first output indication comprises:

means for scanning one of said two-dimensional image areas of said input image pattern substantially parallel to said axis of said one of said two-dimensional image areas and for producing a first output signal indicative, at any instant of time during said scanning, of the integral of said one of said two-dimensional image areas substantially perpendicular to said axis at the current scanning location.

5. The apparatus defined in claim 4 wherein said means for comparing comprises:

an acousto-optic modulator for modulating light applied to said modulator in accordance with said first output signal, which is also applied to said modulator;

filter means containing a representation of the two-dimensional image area in said predetermined image pattern which corresponds to said one of said two-dimensional image areas; and means for directing the light modulated by said modulator to said filter means, the representation contained by said filter means being such that said filter means transmits more of said modulated light when said modulated light corresponds to the modulated light that would be produced if said one of said two-dimensional image area in were the corresponding two-dimensional image area in said predetermined image pattern than if said one of said two-dimensional image areas were different from the corresponding two-dimensional image area in said predetermined image pattern.

6. The apparatus defined in claim 5 wherein said input image pattern is to be verified as corresponding to said predetermined image pattern even though said input image pattern is blurred by a predetermined amount relative to said predetermined image pattern, and wherein said filter means also contains a representation of said predetermined image pattern blurred by said predetermined amount.

7. The apparatus defined in claim 5 wherein said input image pattern is to be verified as corresponding to said predetermined image pattern even though said input image pattern is skewed relative to said axis of said one of said two-dimensional image areas by a predetermined amount as compared to said predetermined image pattern, and wherein said filter means also contains a representation of said predetermined image pattern skewed relative to said axis by said predetermined amount.

8. The apparatus defined in claim 5 wherein said means for producing a second output indication comprises:

means for detecting the light transmitted by said filter means and for producing a second output signal indicative of the amount of light thus detected; and means for monitoring said second output signal for a predetermined characteristic and for producing a third output signal if said second output signal has said predetermined characteristic.

9. The apparatus defined in claim 8 wherein the amplitude of said second output signal is proportional to the amount of light detected by said means for detecting, and wherein said means for monitoring produces said third output signal if the amplitude of said second output signal exceeds a predetermined amplitude threshold.

10. The apparatus defined in claim 1 wherein said input image pattern appears on a product, and wherein said apparatus further comprises:

means responsive to said second output indication for conveying said product along a first path if said input image pattern results in production of said second output indication, and for conveying said product along a second path if said input image pattern does not result in production of said second output indication.

11. The apparatus defined in claim 9 wherein said input image pattern appears on a product and wherein said apparatus further comprises:

means responsive to said third output signal for separating said product from other products if said input image pattern does not cause production of said third output signal, said other products being products bearing an image pattern which does cause production of said third output signal.

12. The apparatus defined in claim 4 wherein said means for comparing comprises:
   filter means containing a representation of the two-dimensional image area in said predetermined image pattern which corresponds to said one of said two-dimensional image areas:
   an acousto-optic modulator;
   means for applying light to said filter means and for directing the light transmitted by said filter means to said acousto-optic modulator; and
   means for applying a signal representative of said first output signal to said acousto-optic modulator so that said modulator modulates light transmitted by said filter means in accordance with said first output signal, the representation contained by said filter means being such that said modulator deflects said transmitted light more strongly at a predetermined angle when said first output signal corresponds to the first output signal that would be produced if said one of said two-dimensional image areas were the corresponding two-dimensional image area in said predetermined image pattern than if said one of said two-dimensional image areas were different from the corresponding two-dimensional image area in said predetermined image pattern.

13. The apparatus defined in claim 12 wherein said means for producing a second output indication comprises:
   means for detecting the light deflected by said modulator at said predetermined angle and for producing a second output signal indicative of the amount of light thus detected; and
   means for monitoring said second output signal for a predetermined characteristic and for producing a third output signal if said second output signal has said predetermined characteristic.

14. The apparatus defined in claim 13 wherein the amplitude of said second output is proportional to the amount of light detected by said means for detecting, and wherein said means for monitoring produces said third output signal if the amplitude of said second output signal exceeds a predetermined amplitude threshold.

15. The apparatus defined in claim 14 wherein said input image pattern appears on a product and wherein said apparatus further comprises:
   means responsive to said third output signal for separating said product from other products if said input image pattern does not cause production of said third output signal, said other products bearing an image pattern which does cause production of said third output signal.

16. The apparatus defined in claim 5 wherein said filter means comprises a modified MACE filter.

17. The apparatus defined in claim 16 wherein said modified MACE filter is formed by inverse-Fourier-transforming a matrix $H = D^{-1}X(X^H D^{-1} X)^{-1} u$, where $$D = \sum_{i=1}^{N} D_i,$$

where $D_i$ is a diagonal matrix in which the diagonal elements are the elements of $X_i$, where $X_i$ is the one-dimensional Fourier transform of each of N training set images used to form said modified MACE filter, where $i = 1, ..., N$, where the superscript $-1$ denotes a matrix inverse, where $X = [X_1 X_2 ... X_N]$ which is a matrix having the $X_i$ as its columns, where the superscript H denotes Hermetian, where u is a vector having elements $u_n$, where $u_n = 1$ for true class training set images, and where $u_n = 0$ for false class training set images.

18. The apparatus defined in claim 12 wherein said filter means comprises a modified MACE filter.

19. The apparatus defined in claim 18 wherein said modified MACE filter is formed by inverse-Fourier-transforming a matrix $H = D^{-1}X(X^H D^{-1} X)^{-1} u$, where $$D = \sum_{i=1}^{N} D_i,$$

where $D_i$ is a diagonal matrix in which the diagonal elements are the elements of $X_i$, where $X_i$ is the one-dimensional Fourier transform of each of N training set images used to form said modified MACE filter, where $i = 1, ..., N$, where the superscript $-1$ denotes a matrix inverse, where $X = [X_1 X_2 ... X_N]$ which is a matrix having the $X_i$ as its columns, where the superscript H denotes Hermetian, where u is a vector having elements $u_n$, where $u_n = 1$ for true class training set images, and where $u_n = 0$ for false class training set images.

20. The apparatus defined in claim 5 wherein said input image pattern may be any one of a plurality of predetermined image patterns, and wherein said filter means comprises:
   a plurality of filters, each of said filters containing a representation of a respective one of said predetermined image patterns.

21. The apparatus defined in claim 20 wherein said filters are disposed in a substantially planar array.

22. The apparatus defined in claim 20 wherein said means for producing a second output indication comprises:
   means for detecting the light transmitted by each of said filters and for producing a plurality of second output signals, each of which is indicative of the amount of light transmitted by a respective one of said filters; and
   means for monitoring at least one of said second output signals for a predetermined characteristic and for producing a third output signal if said second output signal has said predetermined characteristic.

23. The apparatus defined in claim 1 wherein said means for producing a first output indication comprises:
   means for scanning each of said two-dimensional image areas substantially parallel to an axis of that two-dimensional image area and for producing a plurality of first output signals, each of which is indicative, at any instant of time during said scanning, of the integral of the associated two-dimensional image area substantially perpendicular to the axis of that two-dimensional image area at the current scanning location.

24. The apparatus defined in claim 23 wherein said means for comparing comprises:
- means for modulating each of a plurality of different carrier frequency signals with a respective one of said first signals;
- means for combining all of the modulated carrier signals to produce a combined signal;
- an acoustooptic modulator for modulating light applied to said modulator in accordance with said combined signal, which is also applied to said modulator;
- filter means containing representations of each of said corresponding two-dimensional image areas in said predetermined image patterns; and
- means for directing the light from said modulator to said filter means, the representations contained by said filter means being such that said filter means transmits more of the modulated light associated with each of said two-dimensional image areas when said modulated light for that two-dimensional image area corresponds to the modulated light that would be produced if that two-dimensional image area were the associated two-dimensional image area in said predetermined image pattern than if that two-dimensional image area were different from the associated two-dimensional image area in said predetermined image pattern.

25. The apparatus defined in claim 24 wherein said representations are disposed in a substantially planar array.

26. The apparatus defined in claim 24 wherein said means for producing a second output indication comprises:
- means for detecting the light transmitted by said filter means for each of said two-dimensional image areas and for producing a plurality of second output signals, each of which is indicative of the amount of light transmitted for a respective one of said two-dimensional image areas; and
- means for monitoring said second output signals for a predetermined characteristic and for producing a third output signal if each of said second output signals has said predetermined characteristic.

27. The apparatus defined in claim 1 wherein each of said two-dimensional image areas comprises a line of text, and wherein said axis is substantially parallel to the length of said line.

28. The method of verifying that an input image pattern corresponds to a predetermined image pattern, each of said patterns including a plurality of two-dimensional image areas arranged in a predetermined array, each of said image areas including image information which varies in both of said two dimensions, said method comprising the steps of:
- producing a first output indication representative of a one-dimensional image of each of the two-dimensional image areas of said input image pattern, each of said one-dimensional images being taken substantially parallel to an axis of the associated two-dimensional image area;
- comparing the first output indication associated with each two-dimensional image area to the first output indication that would result if said two-dimensional image area were the corresponding two-dimensional image area in said predetermined image pattern; and
- producing a second output indication indicating that said input image pattern is said predetermined image pattern if said comparing step indicates that said output indication associated with each two-dimensional image area is substantially the same as the first output indication that would result if each two-dimensional image area were the corresponding two-dimensional image area in said predetermined image pattern.

29. The method defined in claim 28 wherein said step of producing a first output indication comprises the steps of:
- directing each of a plurality of portions of one of said two-dimensional image areas of said input image pattern to a respective one of a plurality of detectors, each of said portions being substantially parallel to said axis of said one of said two-dimensional image areas, and said portions being substantially mutually exclusive and collectively exhaustive of the dimension of said one of said two-dimensional image areas perpendicular to said axis, each of said detectors producing an output signal indicative of the image information received by it; and
- summing the output signals of said detectors to produce said first output indication for said one of said two-dimensional image areas.

30. The method defined in claim 29 wherein the location of said one of said two-dimensional image areas substantially perpendicular to said axis of said one of said two-dimensional image areas is subject to change throughout a range which is greater than the dimension of said one of said two-dimensional image areas perpendicular to said axis, wherein said portions are substantially mutually exclusive and collectively exhaustive of said range, and wherein said summing step comprises the step of:
- selecting which detector outputs are summed to produce said first output indication.

31. The method defined in claim 28 wherein said step of producing a first output indication comprises the step of:
- scanning one of said two-dimensional image areas of said input image pattern substantially parallel to said axis of said one of said two-dimensional image areas in order to produce a first output signal indicative, at any instant of time during said scanning, of the integral of said one of said two-dimensional image areas substantially perpendicular to said axis at the current scanning location.

32. The method defined in claim 31 wherein said comparing step comprises the steps of:
- using an acousto-optic modulator to modulate light applied to said modulator in accordance with said first output signal, which is also applied to said modulator; and
- using a filter containing a representation of the two-dimensional image area in said predetermined image pattern which corresponds to said one of said two-dimensional image areas to filter the light modulated by said modulator, the representation contained by said filter being such that said filter transmits more of said modulated light when said modulated light corresponds to the modulated light that would be produced if said one of said two-dimensional image areas were the corresponding two-dimensional image area in said predetermined image pattern than if said one of said two-dimensional image areas were different from the corresponding two-dimensional image area in said predetermined image pattern.

33. The method defined in claim 32 wherein said input image pattern is to be verified as corresponding to said predetermined image pattern even though said input image pattern is blurred by a predetermined amount relative to said predetermined image pattern, and wherein said filter also contains a representation of said predetermined image pattern blurred by said predetermined amount.

34. The method defined in claim 32 wherein said input image pattern is to be verified as corresponding to said predetermined image pattern even though said input image pattern is skewed relative to said axis of said one of said two-dimensional image areas by a predetermined amount as compared to said predetermined image pattern, and wherein said filter also contains a representation of said predetermined image pattern skewed relative to said axis by said predetermined amount.

35. The method defined in claim 32 wherein said step of producing a second output indication comprises the steps of:
detecting the light transmitted by said filter in order to produce a second output signal indicative of the amount of light thus detected; and
monitoring said second output signal for a predetermined characteristic in order to produce a third output signal if said second output signal has said predetermined characteristic.

36. The method defined in claim 35 wherein the amplitude of said second output signal is proportional to the amount of light detected in said detecting step, and wherein said monitoring step results in production of said third output signal if the amplitude of said second output signal exceeds a predetermined amplitude threshold.

37. The method defined in claim 28 wherein said input image pattern appears on a product, and wherein said method further comprises the steps of:
conveying said product along a first path if said input image pattern results in production of said second output indication; and
conveying said product along a second path if said input image pattern does not result in production of said second output indication.

38. The method defined in claim 36 wherein said input image pattern appears on a product and wherein said method further comprises the step of:
separating said product from other products if said input image pattern does not cause production of said third output signal, said other products being products bearing an image pattern which does cause production of said third output signal.

39. The method defined in claim 31 wherein said comparing step comprises the steps of:
using a filter containing a representation of the two-dimensional image area in said predetermined image pattern which corresponds to said one of said two-dimensional image areas to filter applied light; and
using an acousto-optic modulator, to which a signal representative of said first output signal is applied, to modulate the light transmitted by said filter in accordance with said first output signal, the representation contained by said filter being such that said modulator deflects said transmitted light more strongly at a predetermined angle when said first output signal corresponds to the first output signal that would be produced if said one of said two-dimensional image areas were the corresponding two-dimensional image area in said predetermined image pattern than if said one of said two-dimensional image areas were different from the corresponding two-dimensional image area in said predetermined image pattern.

40. The method defined in claim 39 wherein said step of producing a second output indication comprises the steps of:
detecting the light deflected by said modulator at said predetermined angle in order to produce a second output signal indicative of the amount of light thus detected; and
monitoring said second output signal for a predetermined characteristic in order to produce a third output signal if said second output signal has said predetermined characteristic.

41. The method defined in claim 40 wherein the amplitude of said second output is proportional to the amount of light detected in said detecting step, and wherein said monitoring step results in production of said third output signal if the amplitude of said second output signal exceeds a predetermined amplitude threshold.

42. The method defined in claim 41 wherein said input image pattern appears on a product and wherein said method further comprises the step of:
separating said product from other products if said input image pattern does not cause production of said third output signal, said other products bearing an image pattern which does cause production of said third output signal.

43. The method defined in claim 32 wherein said filter is a modified MACE filter.

44. The method defined in claim 43 wherein said modified MACE filter is formed by inverse-Fourier-transforming a matrix $H = D^{-1}X(X^H D^{-1}X)^{-1}u$, where $$D = \sum_{i=1}^{N} D_i,$$

where $D_i$ is a diagonal matrix in which the diagonal elements are the elements of $X_i$, where $X_i$ is the one-dimensional Fourier transform of each of N training set images used to form said modified MACE filter, where $i = 1, ..., N$, where the superscript $-1$ denotes a matrix inverse, where $X = [X_1 X_2 ... X_N]$ which is a matrix having the $X_i$ as its columns, where the superscript H denotes Hermetian, where u is a vector having elements $u_n$, where $u_n = 1$ for true class training set images, and where $u_n = 0$ for false class training set images.

45. The method defined in claim 39 wherein said filter is a modified MACE filter.

46. The method defined in claim 45 wherein modified MACE filter is formed by inverse-Fourier-transforming a matrix $H = D^{-1}X(X^H D^{-1}X)^{-1}u$, where $$D = \sum_{i=1}^{N} D_i,$$

where $D_i$ is a diagonal matrix in which the diagonal elements are the elements of $X_i$, where $X_i$ is the one-dimensional Fourier transform of each of N training set images used to form said modified MACE filter, where $i = 1, ..., N$, where the superscript $-1$ denotes a matrix inverse, where $X = [X_1 X_2 ... X_N]$ which is a matrix having the $X_i$ as its columns, where the superscript H denotes Hermetian, where u is a vector having elements $u_n$, where $u_n=1$ for true class training set images, and where $u_n=0$ for false class training set images.

47. The method defined in claim 32 wherein said input image pattern may be any one of a plurality of predetermined image patterns, and wherein said step of using a filter comprises the step of:
using a plurality of filters, each of said filters containing a representation of a respective one of said predetermined image patterns.

48. The method defined in claim 47 wherein said filters are disposed in a substantially planar array.

49. The method defined in claim 47 wherein said step of producing a second output indication comprises the steps of:
detecting the light transmitted by each of said filters in order to produce a plurality of second output signals, each of which is indicative of the amount of light transmitted by a respective one of said filters; and
monitoring at least one of said second output signals for a predetermined characteristic in order to produce a third output signal if said second output signal has said predetermined characteristic.

50. The method defined in claim 28 wherein said step of producing a first output indication comprises the step of:
scanning each of said two-dimensional image areas substantially parallel to an axis of that two-dimensional image area in order to produce a plurality of first output signals, each of which is indicative, at any instant of time during said scanning, of the integral of the associated two-dimensional image area substantially perpendicular to the axis of that two-dimensional image area at the current scanning location.

51. The method defined in claim 50 wherein said comparing step comprises the steps of:
modulating each of a plurality of different carrier frequency signals with a respective one of said first signals;
combining al of the modulated carrier signals to produce a combined signal;
using an acoustooptic modulator to modulate light applied to said modulator in accordance with said combined signal, which is also applied to said modulator; and
using a filter containing representations of each of said corresponding two-dimensional image areas in said predetermined image patterns to filter the light from said modulator, the representations contained by said filter being such that said filter transmits more of the modulated light associated with each of said two-dimensional image areas when said modulated light for that two-dimensional image area corresponds to the modulated light that would be produced if that two-dimensional image area were the associated two-dimensional image area in said predetermined image pattern than if that two-dimensional image area were different from the associated two-dimensional image area in said predetermined image pattern.

52. The method defined in claim 51 wherein said representations are disposed in a substantially planar array.

53. The method as defined in claim 51 wherein said step of producing a second output indication comprises the steps of:
detecting the light transmitted by said filter for each of said two-dimensional image areas in order to produce a plurality of second output signals, each of which is indicative of the amount of light transmitted for a respective one of said two-dimensional image areas; and
monitoring said second output signals for a predetermined characteristic in order to produce a third output signal if each of said second output signals has said predetermined characteristic.

54. The method defined in claim 28 wherein each of said two-dimensional image areas comprises a line of text, and wherein said axis is substantially parallel to the length of said line.

* * * * *